3,307,889
BEARING RETAINER
Arthur S. Grange, South Bend, Ind., assignor to The Torrington Company, Torrington, Conn., a corporation of Maine
Filed July 14, 1964, Ser. No. 382,458
8 Claims. (Cl. 308—187)

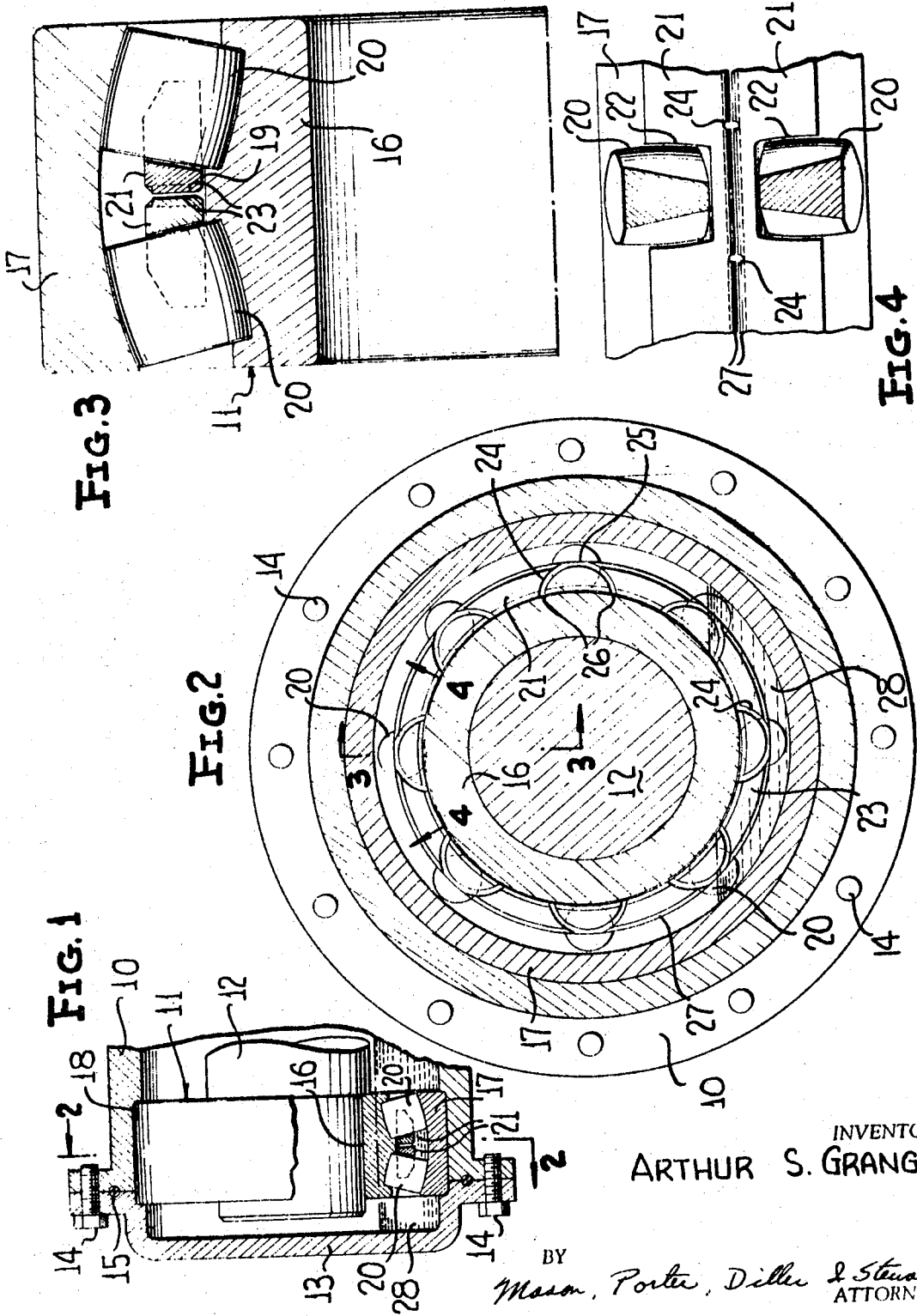
March 7, 1967 — A. S. GRANGE — 3,307,889
BEARING RETAINER
Filed July 14, 1964
INVENTOR
ARTHUR S. GRANGE
BY Mason, Porter, Diller & Stewart
ATTORNEYS United States Patent Office 3,307,889
Patented Mar. 7, 1967

This invention relates in general to new and useful improvements in bearings, and more specifically to a novel bearing retainer.

Many bearings, particularly large bearings, are mounted in housings with only lower portions of the bearings being submerged within a lubricant. As the bearing rotates, the components thereof pass down into the lubricant and for the most part are properly lubricated thereby. However, it has been found in large diameter bearings, particularly bearings having retainers, that it is desirable to utilize the rotating retainers to effect the pumping of lubricant. In double row bearings, the retainers are mounted in back-to-back relation. It has been found in the past that by properly grooving the retainers, lubricant will be scooped up by the rotating containers in the grooves and the lubricant will be properly distributed between the retainers and between the retainers and the inner race of the bearing on which the retainers ride.

In the past the grooving of bearing retainers to form oil passages therein has been a straight line grooving. This poses several problems. In the first place, it is necessary to provide left and right retainers in that it is necessary that the lubricant passages be properly sloped in order to scoop up the lubricant as the retainers rotate. Secondly, even though left and right retainers are provided, it is necessary that they be properly oriented with the direction of rotation of the bearing. Thirdly, when the bearing is subject to reverse rotations, there will be no scooping up of lubricant during rotation in one direction.

In view of the foregoing, it is the primary object of this invention to provide a bearing retainer having lubricant passages in an end surface thereof which are so configurated whereby lubricant will be scooped up in the lubricant passages irrespective of the direction of rotation of the retainer.

Another object of this invention is to provide a novel lubricant passage arrangement for bearing retainers, the lubricant passages being arcuate in outline and having the central portion of each lubricant passage opening through the outer edge of the surface of the bearing retainer whereby lubricant maay be scooped through one half of the lubricant passage irrespective of the direction of rotation of the retainer.

Another object of this invention is to provide a novel lubricant passage in a bearing retainer for the purpose of scooping up lubricant and transmitting lubricant to the inner part of the bearing retainer, the lubricant passages being portions of circles whereby they may be readily formed by such conventional machining tools as a fly cutter.

A further object of this invention is to provide a novel lubricant passage in opposed end surfaces of a pair of bearing retainers disposed in back-to-back relation, the lubricant passages being of a nature wherein the pumping or scooping of lubricant is assured irrespective of the direction of rotation of the retainers, and the lubricant passages being of such a construction whereby they may be readily incorporated in existing types of bearing retainers.

With the above, and other objects in view that will hereinafter appear, the nature of the invention will be more clearly understood by reference to the following detailed description, the appended claims and the several views illustrated in the accompanying drawing.

In the drawing:

FIGURE 1 is a fragmentary vertical sectional view taken through a conventional type of bearing installation utilizing bearing retainers formed in accordance with this invention.

FIGURE 2 is an enlarged fragmentary vertical sectional view taken along the line 2—2 of FIGURE 1 and shows specifically the details of the lubricant passages formed in the bearing retainer.

FIGURE 3 is an enlarged fragmentary longitudinal sectional view taken along the line 3—3 of FIGURE 2 and shows more specifically the details of the bearing, the bearing being shown separated from the associated shaft and housing.

FIGURE 4 is a fragmentary sectional view taken along the line 4—4 of FIGURE 2 and shows further the relationship of the bearing retainers with respect to rollers retained thereby.

Referring now to the drawings in detail, it will be seen that there is illustrated in FIGURE 1 a conventional type of bearing installation utilizing retainers formed in accordance with this invention. The bearing installation illustrated in FIGURE 1 includes a housing 10 in which there is mounted a double row self-aligning roller bearing which is generally referred to by the numeral 11. The roller bearing 11 carries a shaft 12 for rotation within the housing 10. The left end of the housing 10 is closed by means of a cap or end plate 13 which is secured in place on the housing 10 by means of bolts 14 and which is sealed relative to the housing 10 by means of a suitable sealing ring 15.

The illustrated bearing 11 includes an inner race 16 which is carried by the shaft 12 for rotation. The bearing 11 also includes an outer race 17 which is seated within a bore 18 formed in the housing 10 and is clamped in place by the end plate 13. Two rows of part spherical rollers 20 are positioned between the races 16 and 17. The rollers 20 are maintained in circumferentially spaced relation by means of a pair of retainers 21.

Each of the retainers 21 is provided with a plurality of pockets 22 which are circumferentially spaced and which open out through one end surface of the retainer 21. It is to be noted that the pockets 22 are configurated in accordance with the contour of the rollers and retain the rollers 20 in the proper positions.

The retainers 21 are conventional except for lubricating features thereof which will be set forth in detail here. Referring now to FIGURE 3 in particular, it will be seen that the retainers 21 are disposed in back-to-back relation and have opposed end surfaces 23 which may be considered back surfaces. It is also to be noted from FIGURE 3 that the retainers 21 ride upon a central projection 19 of the inner race 16 between the two rows of rollers 20. It is desired to pass lubricant between the two retainers 21 to the projecting surface 19.

In accordance with this invention, the end or back surface 23 of each retainer 21 is provided with a plurality of lubricant passages 24. The lubricant passages 24 are illustrated as being aligned with the pockets in the retainers, but the arrangement could vary. Each lubricant passage 24 has the outline of a part circle and includes a central portion 25 and a pair of ends 26. The central portion 25 opens out of the end surface in a radial direction through the outer surface of the retainer 21. The two ends of the lubricant passage 24 open out of the end surface 23 through the inner surface of the retainer 21.

At this time it is pointed out that the retainers 21 are beveled at the intersections between their back surfaces 23 and their outer surfaces, as at 27. This beveling of the retainers 21 facilitates the entry of lubricant between the opposed end surfaces of the retainers 21. Since a major part of the central portion 25 of each lubricant passage 24 opens into the beveled out portion of the retainer 21, it will be seen that lubricant flow into the lubricant passages 24 is facilitated.

It is well known that in a bearing of the type illustrated in the drawings, the retainer rotates with the inner race but at one-half the speed thereof. However, due to the fact that the retainers 21 rotate, the motion of the retainers 21 can be utilized for the scooping up or pumping of oil into the space between the retainers 21 and the projection 19 of the inner race 16.

It is to be noted that the housing 10 has the lower portion thereof filled with a suitable lubricant 28 which is readily flowable. Assuming the retainer 21 illustrated in FIGURE 2 to be rotating in a clockwise direction, it will be seen that as the retainer 21 passes down into the lubricant 28, the trailing portion of each lubricant passage 24 is substantially vertically disposed at the time it enters into the lubricant 28. As the retainer moves through the lubricant 28, the trailing portion of each lubricant passage 24 rotates from a generally vertical position to a generally horizontal position. The motion of the retainer 21 through the lubricant 28 results in a scooping up or force feeding of lubricant through the lubricant passages 24. Furthermore, since the lubricant passages are filled with lubricant at the time they pass out of the lubricant 28, it will be seen that the lubricant received within the lubricant passages will flow radially inwardly towards the inner race 16 and continue to supply lubricant after the particular lubricant passage has passed out of the lubricant.

Lubricant delivered to the space between the retainers 21 and the inner race 16 will serve to lubricate the retainers 21 with respect to the inner race 16 and thus prevent excess friction between the relatively moving parts. The lubricant will also flow longitudinally outwardly from the center of the bearing towards the rollers 20 and will provide luibrication between the rollers 20 and the inner race 16.

It will be readily apparent that only the trailing portion of each of the lubricant passages 24 will function to feed lubricant during the rotation of the bearing 11. However, it will be readily apparent that it is immaterial as to the direction in which the retainer 21 rotates. It will be readily apparent from FIGURE 2 that the retainer 21 will pump lubricant equally as well whether it is rotating in a clockwise direction or a counterclockwise direction. Therefore, the retainers of the bearing 11 may be identical and it is immaterial as to how they are mounted within the bearing 11 as far as orientation for the purpose of pumping lubricant is concerned. Furthermore, it will be readily apparent that the retainers 21 will continue to pump lubricant even when the rotation of the shaft 12 is reversed.

The retainers 21 have an added feature in that they may be easily machined. It is to be noted that the lubricant passages 24 lie along a circular path. Therefore, the lubricant passages 24 can be cut into the retainers 21 utilizing conventional machine tooling, such as fly cutters, etc.

Although only a preferred embodiment of the invention has been specifically illustrated and described here, it is to be understood that minor variations may be made in the illustrated retainer construction within the spirit and scope of the invention, as defined by the appended claims.

I claim:

1. A bearing retainer assembly comprising a pair of retainers disposed in back-to-back relation, each of said retainers having inner and outer surfaces and a back surface, the back surface of at least one retainer being provided with a plurality of circumferentially spaced lubricant passages for delivering lubricant between said retainers from the outer surfaces thereof to the inner surfaces thereof, each of said lubricant passages being arcuate in outline and having a central portion opening through the outer edge of said back surface for the reception of lubricant and two end portions opening through the inner edge of said back surface for the delivery of lubricant depending upon the direction of rotation of said retainer assembly.

2. The retainer assembly of claim 1 wherein each lubricant passage lies along a circular path.

3. A bearing retainer assembly comprising a pair of retainers disposed in back-to-back relation, each of said retainers having inner and outer surfaces and a back surface, the back surface of at least one retainer being provided with a plurality of circumferentially spaced lubricant passages for delivering lubricant between said retainers from the outer surfaces thereof to the inner surfaces thereof, each of said lubricant passages being formed of two like portions extending between said inner and outer surfaces, each lubricant passage portion being in the form of a scoop for scooping up lubricant as said retainer assembly rotates through a lubricant supply, and the two portions of each lubricant passage facing in opposite directions whereby each lubricant passage will have a portion thereof functioning irrespective of the direction of rotation of the retainer assembly.

4. The retainer assembly of claim 3 wherein each lubricant passage portion is arcuate in outline.

5. The retainer assembly of claim 3 wherein each lubricant passage portion is arcuate in outline and lies along a circular path common with the other portion of the respective lubricant passage.

6. An annular bearing retainer having lubricant delivery means, said retainer having inner and outer surfaces and a pair of end surfaces, one of said end surfaces being planar and having a plurality of circumferentially spaced lubricant passages formed therein for delivering lubricant from the outer surface of said retainer to the inner surface thereof, the other of said end surfaces having pockets formed therein to facilitate positioning of rotatable bearing members, each of said lubricant passages being arcuate in outline and having a central portion opening through the outer edge of said one end surface for the reception of lubricant and two end portions opening through the inner edge of said one end surface for the delivery of lubricant in accordance with the direction of rotation of said retainer.

7. The retainer of claim 6 wherein said retainer is bevelled at the intersection of said one end surface and said outer surface and said lubricant passage central portion opens through said bevelled portion.

8. The retatiner of claim 6 wherein each lubricant passage lies along a circular path.

References Cited by the Examiner

UNITED STATES PATENTS 1,476,345  12/1923  McGee _____ 308—163

FOREIGN PATENTS 458,856  8/1949  Canada.

MARTIN P. SCHWADRON, *Primary Examiner.*

FRANK SUSKO, *Examiner.*